(No Model.)

J. WENGER.
MACHINE FOR FEEDING AND SETTING STUDS.

No. 350,709. Patented Oct. 12, 1886.

(No Model.)

5 Sheets—Sheet 2.

J. WENGER.
MACHINE FOR FEEDING AND SETTING STUDS.

No. 350,709. Patented Oct. 12, 1886.

Witnesses.
H. J. Ferguson
A. B. Fairchild

Inventor:
Julius Wenger
By A. M. Wooster
Atty.

(No Model.)

5 Sheets—Sheet 3.

J. WENGER.
MACHINE FOR FEEDING AND SETTING STUDS.

No. 350,709. Patented Oct. 12, 1886.

Witnesses.
H. J. Ferguson
C. E. Ruggles

Inventor
Julius Wenger
By A. M. Wooster
atty.

(No Model.)  5 Sheets—Sheet 4.
J. WENGER.
MACHINE FOR FEEDING AND SETTING STUDS.
No. 350,709.  Patented Oct. 12, 1886.
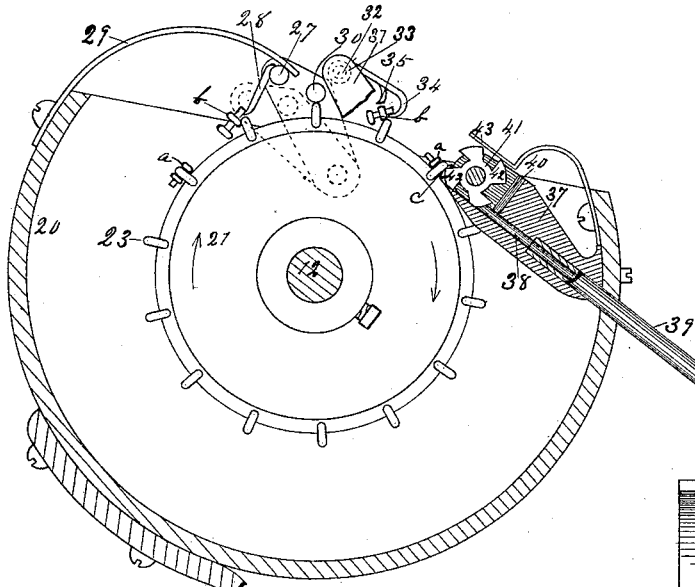
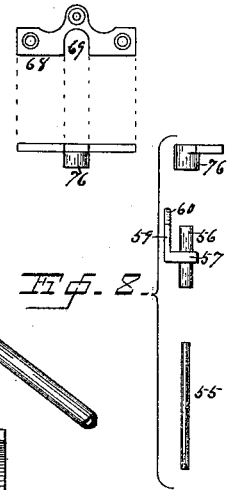
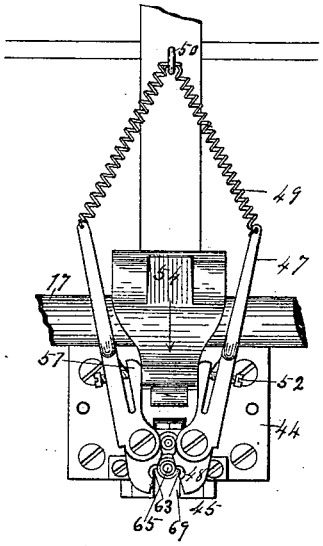
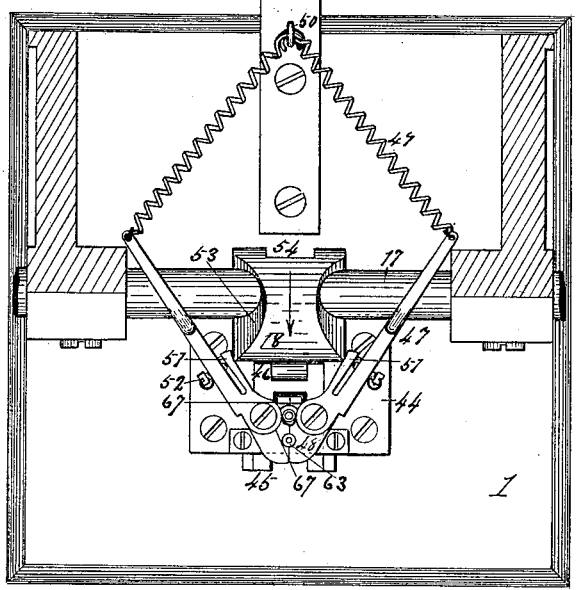
Witnesses—
H. J. Ferguson
C. E. Ruggles
Inventor
By Julius Wenger
A. M. Wooster
atty.

(No Model.)  5 Sheets—Sheet 5.

J. WENGER.
MACHINE FOR FEEDING AND SETTING STUDS.

No. 350,709.  Patented Oct. 12, 1886.

Witnesses.
H. J. Ferguson
C. E. Ruggles

Inventor:
Julius Wenger
By A. M. Wooster
atty.

UNITED STATES PATENT OFFICE.

JULIUS WENGER, OF BRIDGEPORT, CONNECTICUT, ASSIGNOR TO THE BLÜN & HENIUS MANUFACTURING COMPANY.

MACHINE FOR FEEDING AND SETTING STUDS.

SPECIFICATION forming part of Letters Patent No. 350,709, dated October 12, 1886.

Application filed July 3, 1886. Serial No. 207,016. (No model.)

*To all whom it may concern:*

Be it known that I, JULIUS WENGER, a citizen of Switzerland, residing at Bridgeport, in the county of Fairfield and State of Connecticut, have invented certain new and useful Improvements in Machines for Automatically Feeding and Setting Studs, Rivets, &c.; and I do hereby declare the following to be a full, clear, and exact description of the invention, such as will enable others skilled in the art to which it appertains to make and use the same.

My invention has for its object to produce a machine for automatically feeding and setting studs, rivets, &c. With these ends in view I have devised the novel mechanism which I will now describe, referring by numbers to the accompanying drawings, forming part of this specification, in which—

Figure 1:
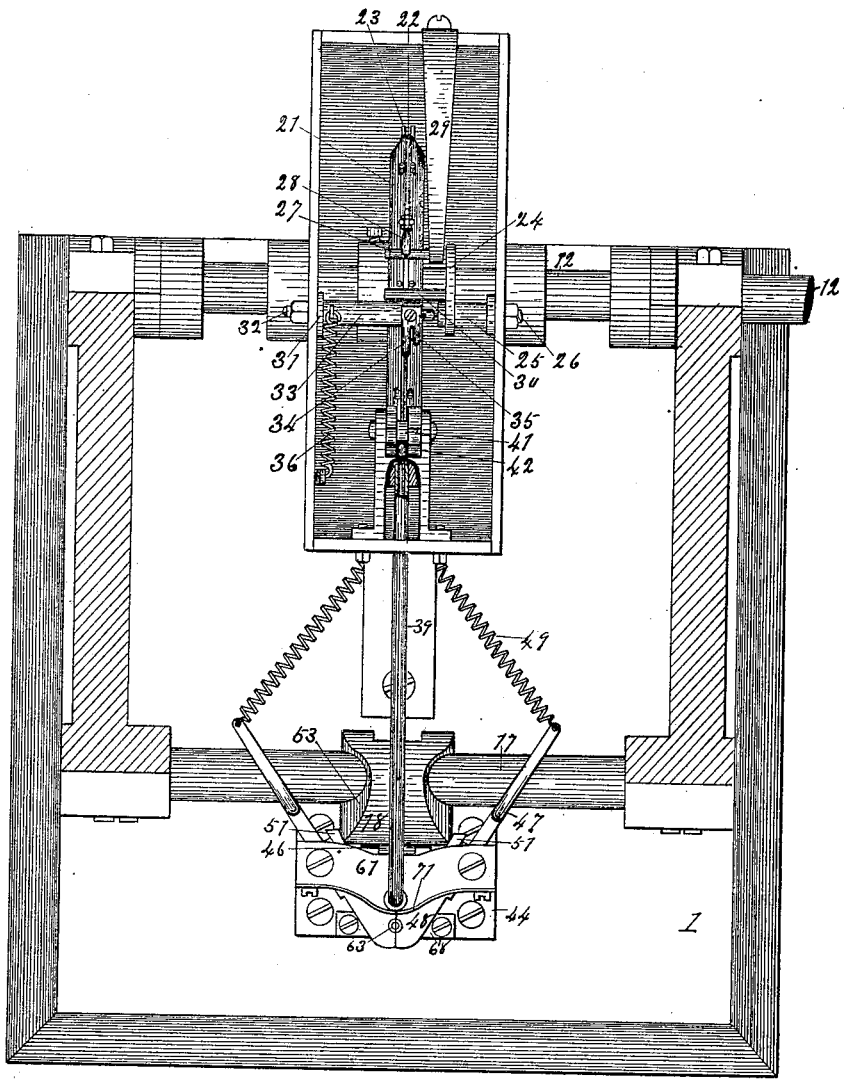
Figure 2:
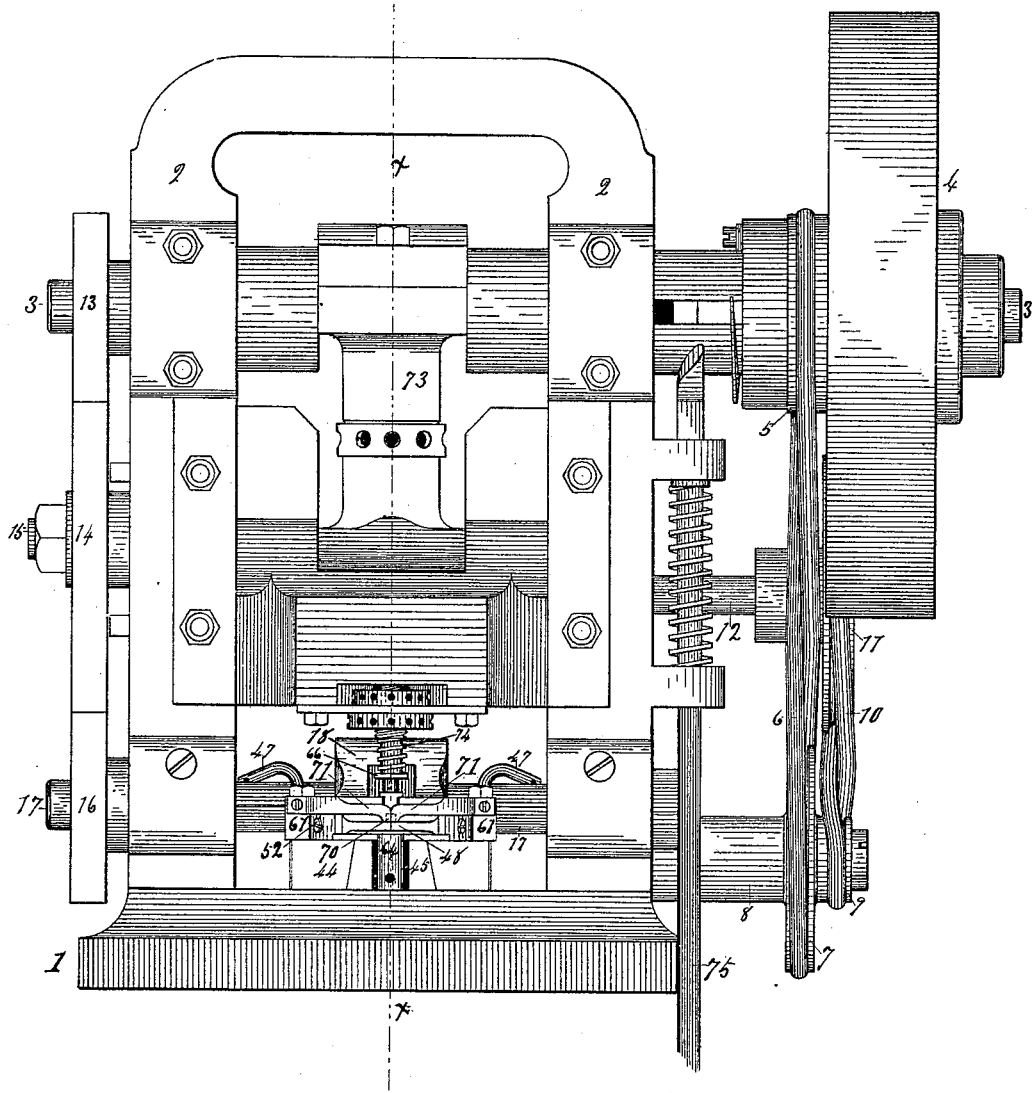
Figure 3:
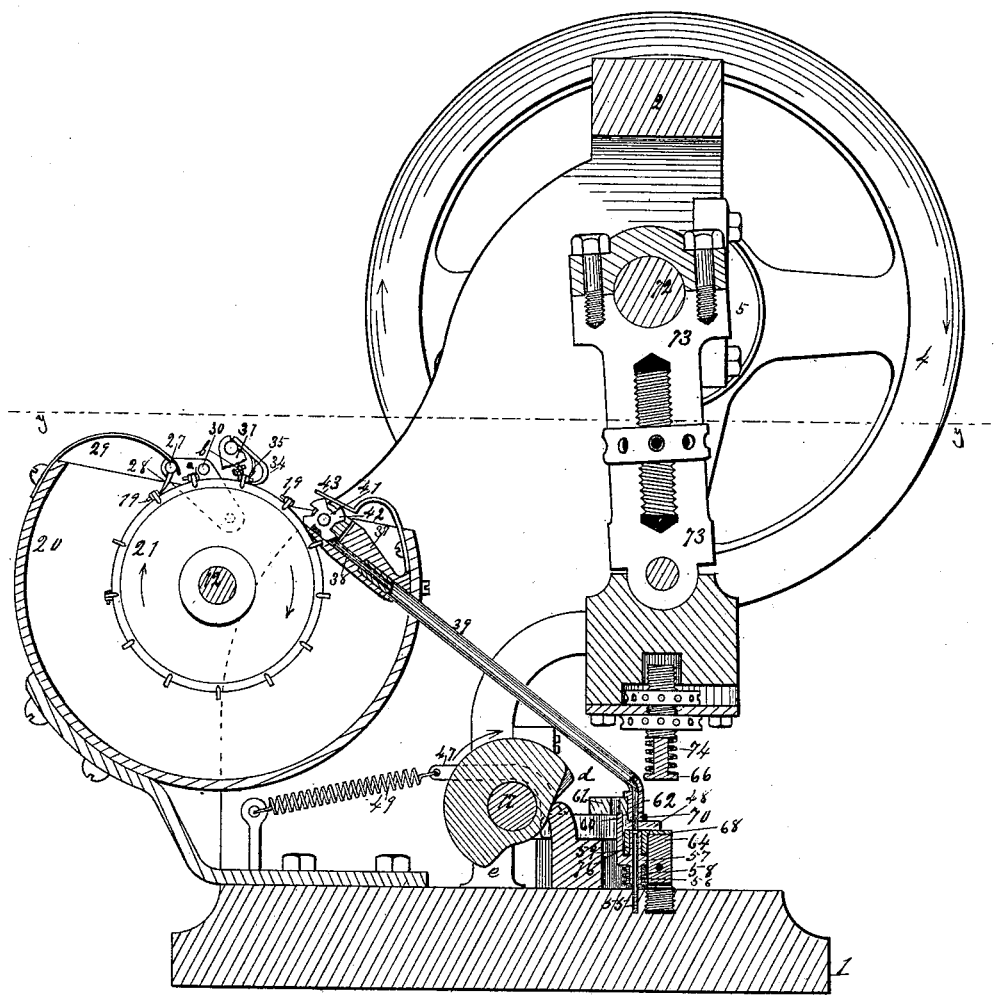
Figure 7:
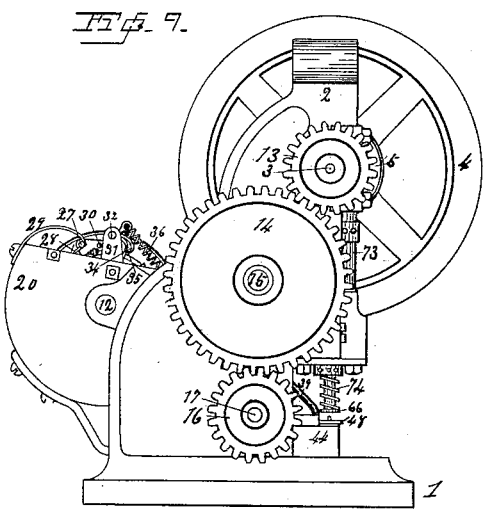
Figure 10:
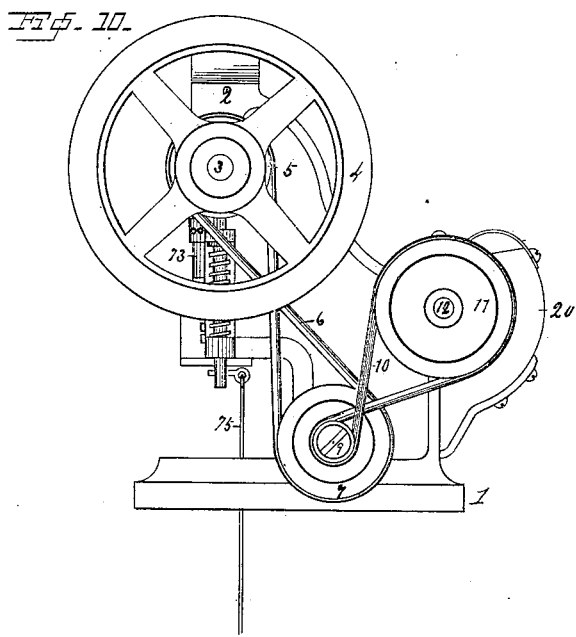

Figure 1 is a plan view of the entire machine; Fig. 2, a front elevation; Fig. 3, a vertical section, the feed-wheel being shown in elevation and the fingers in their lowered positions; Fig. 4, an enlarged detail view showing the hopper in section, the feed-wheel in elevation, and the fingers in their raised positions; Fig. 5, a plan view illustrating the operation of the setting mechanism, the bridge being removed and the jaws in their advanced position closed; Fig. 6, a detail view corresponding with Fig. 5, except that the cam has made a partial revolution, allowing the jaws to open, the return movement being about to commence; Fig. 7, plan and edge views of the plate at front of slide; Fig. 8, a detail view showing rod, sleeve, and plate detached; Fig. 9, an end elevation showing the gearing by which motion is imparted to the cam which closes the clamping-arms; and Fig. 10 is an elevation of the opposite end of the machine, showing the manner in which motion is imparted to the feed-wheel.

Similar numbers denote the same parts in all the figures.

It will of course be understood that my machine is adapted to all classes of work in which the operation of setting studs or rivets is required. I have found it of especial value in setting fastening-studs in corset-clasps. I have therefore illustrated a machine constructed for that purpose in the drawings.

1 denotes the bed, and 2 the frame-work, which are preferably made of metal, as considerable strength is required.

3 is the main shaft, which is journaled on opposite sides of the frame-work, and carries a fly-wheel, 4, which also serves as a driving-pulley, a belt (not shown) extending from this wheel to a driving-shaft. (Not shown.)

5 is a pulley on the main shaft, integral with the fly-wheel, and 6 a belt, preferably crossed, which extends from pulley 5 to a pulley, 7, journaled on a stud, 8, projecting from the side of the frame-work.

9 is a pulley on stud 8, which is made integral with pulley 7, or is rigidly secured thereto.

10 is a belt, preferably crossed, which extends from pulley 9 to a pulley, 11, on shaft 12, which also carries the feed-wheel.

13 is a gear on the opposite end of the main shaft, 14 an intermediate gear journaled on a stud, 15, and 16 a gear on shaft 17, which also carries cam 18, for operating the clamping-arms, as will be more fully explained. Gear 16 meshes with the intermediate gear and receives motion therefrom.

19 indicates fastening studs for corset-clasps, which are shown in the drawings to illustrate more clearly the operation of the machine. These studs are placed loosely in hopper 20. Any number may be placed in the hopper, as the machine works equally well whether the hopper is nearly full or nearly empty.

21 denotes the feed-wheel, which is carried by shaft 12, and rotates in the center of the hopper.

22 denotes a groove in the periphery of the feed-wheel, and 23 pins which are placed in pairs on opposite sides of the groove. As the feed-wheel rotates in the hopper the studs are caught between the pins and carried forward by the feed-wheel, being caused to lie longitudinally of the groove. As it is essential that they shall be carried forward either head first or point first, depending, of course, upon the character of the work done by the machine, and as they are as likely to be picked up with one end first as the other, I have provided devices, which I will now describe, for throwing them off from the feed-wheel when not picked up and carried forward in proper position.

My present machine is so organized as to provide that the studs should be carried forward with the heads foremost. As a matter of fact, in this class of studs there are two heads, one of which, when in position, lies against the corset-clasp, and the other projects above it to be engaged by a hook upon the other clasp, in the usual manner.

24 denotes an arm secured to a sleeve, 25, which is journaled upon a stud, 26, which projects inward from the side of the hopper.

27 denotes a pin which projects inward from arm 24 and extends across the top of the feed-wheel.

28 denotes a finger secured to pin 27. This finger projects downward, and when in its normal position rests in the groove in the periphery of the feed-wheel, preferably on the bottom.

29 is a spring secured to the hopper, which curves over and rests upon pin 27, acting to hold finger 28 in position on the periphery of the feed-wheel.

30 denotes another pin projecting inward from arm 24, which extends over the feed-wheel in the same manner as pin 27. This pin is so located relatively to finger 28 and to the pins 23, which project radially from the feed-wheel, that at the proper moment finger 28 will be raised by one pair of pins 23, which will pass under it, as will presently be more fully explained.

31 is a rigid arm projecting upward from the side of the hopper, and provided at its upper end with a stud, 32, upon which a sleeve, 33, is journaled. At the end of the sleeve are secured two other fingers, 34 and 35. These fingers curve downward and are of sufficient length to throw out studs which have been picked up by pins 23 otherwise than in the proper manner.

36 is a spring which is connected to the sleeve and to the hopper, and acts to hold fingers 34 and 35 in operative position.

It will of course be understood that there are several false positions in which the studs may be picked up by pins 23, and that it is necessary they should be thrown out unless they have been seized in just the right manner.

In Figs. 3 and 4 the feed-wheel is represented as rotating from left to right, as indicated by the arrow. In the present instance I have so adjusted the fingers as to throw out all studs which have not been picked up in the manner indicated at $a$ in Figs. 3 and 4—that is, longitudinally of the groove in the feed-wheel, between pins 23, the heads of the studs being forward, and with said pins resting between the two heads of the studs. When the studs are caught in this manner, finger 28 just reaches the head of the stud, but with slight, if any, contact therewith. At this instant pin 30 comes in contact with the next pair of pins 23, by which it is raised, carrying the arm and finger 28 with it, so that the finger just moves over the head of the stud, but without disturbing it. When, however, the stud has been caught with the shank end forward, as at $b$ in Figs. 3 and 4, the point of the finger passes under the point of the stud, and when the finger is raised by the engagement of pin 30 with pins 23 on the feed-wheel, the stud is thrown out from between the pins, as indicated in Fig. 4, and drops down into the hopper. If it should happen that a stud were caught in such a manner that both heads should be forward of pins 23, instead of said pins resting between the heads, this also would be a false position of the stud, and it would be expelled the same as if it were presented with the shank end forward. Another false position of the studs, which, however, I have not deemed it necessary to illustrate, is when they are caught by pins 23, but lie crosswise of the groove in the feed-wheel instead of longitudinally thereto. Studs picked up in this manner are instantly thrown off by finger 35, which extends down as far as the periphery of the feed-wheel, but slightly at one side of the groove.

In order to guard against any possibility of the studs not being thrown out when picked up in false positions, I have provided a finger, 34, as already described, which supplements the action of finger 28. This finger is so formed and pivoted relatively to pins 23 upon the feed-wheel that when a stud is caught in the proper manner the point of the finger slides over the head, which passes under it; but if a stud is caught in any other than the proper manner this finger will catch it and throw it out, as indicated in Figs. 3 and 4.

37 denotes a magazine, which is secured to the inner side of the hopper, and which is provided with a circular opening, 38, which is just large enough to receive the studs and allow them to slide downward by gravity, the magazine being preferably set at an angle.

39 is a tube connected to the magazine, the central opening of which is just the same diameter as opening 38 in the magazine, so that the studs may be carried directly to the setting mechanism, which may be located at any reasonable distance from the feeding mechanism.

At the upper end of the magazine is an opening, 40, in which is pivoted a guide-wheel, 41, which is formed like a sprocket-wheel.

42 indicates the arms or sprockets, each pair being adapted to receive a stud from the feed-wheel and guide it into the magazine.

43 is a spring which is adapted to bear upon wheel 41 to hold it in the proper position. The wheel may of course be provided with any number of sprockets. In the present instance I have shown four. As each stud is received from the feed-wheel, wheel 41 makes a quarter-turn and guides the stud which it receives into the magazine. As it is inevitable that the studs shall be supplied to the magazine by the feed-wheel and sprocket faster than they can be disposed of by the setting mechanism, I have so proportioned pulleys 9 and 11 relatively to each other that when belt 10 is moderately loose it will slide upon pulley 11, thus allowing the feed-wheel to remain stationary as soon as the magazine becomes filled, so that it cannot receive the studs from wheel 41. In practice the instant the magazine is filled the feed-wheel stops, leaving one of the studs and the sprocket in the position indicated by $c$ in Fig. 4.

I will now proceed to describe the setting and riveting mechanism, which is clearly illustrated in Figs. 2, 3, 5, and 6.

44 is a block firmly secured to the bed of the machine, and 45 a slide adapted to reciprocate in said block. At the rear end of this slide is an upwardly-projecting stump, 46, which is adapted to be acted on by cam 18.

47 denotes a pair of clamping-arms pivoted to the slide, and 48 the jaws made integral with said arms. The clamping-arms are curved over and extend backward and outward.

49 denotes springs, one end of each spring being connected to the rear end of one of the clamping-arms, and the other end of each spring attached to an eye, 50, which is secured in the bed. The action of these springs is to draw the slide backward, and also to draw the rear ends of the clamping-arms toward each other, thus opening the jaws at the proper time.

51 denotes spring projections on the inner side of the clamping-arms, which are adjusted by set-screws 52 and bear against the opposite faces of cam 18. It will be observed in Figs. 3 and 5 that cam 18 is set eccentrically upon shaft 17, that the opposite faces of said cam are curved inward, as at 53, and that the periphery of said cam is provided with a groove, 54. The forward movement of the slide is caused by engagement of stump 46 with the periphery of the cam-groove 54, being sufficiently wide to permit the stump to pass through it. The function of curves 53 is to impart certain movements to the jaws irrespective of the movement of the slide, springs 49 acting both to draw the slide backward, thus keeping stump 46 in contact with the periphery of the cam, and also to keep spring-arms 51 in contact with the inwardly-curved faces 53, all of which will presently be more fully explained.

55 is a rod projecting upward from the bed, 56 a sleeve upon said rod, 57 a shoulder on the sleeve, 58 a spring under the shoulder which acts to force the sleeve upward, and 59 an arm projecting upward from the shoulder, the upper end of which is beveled on opposite sides, as indicated at 60, (see Fig. 8,) for a purpose presently to be explained.

76 is a sleeve which depends from a plate, 68, secured to the top of the slide at the front. This sleeve is of just sufficient diameter to permit sleeve 56 to move freely within it, and acts to hold the parts firmly in position, and also as a stop to limit the upward movement of sleeve 56 and arm 59.

61 is a cross-piece or bridge, which extends across the top of block 44 over the clamping-arms, the latter being free to operate under said bridge.

62 is a guide-block secured to the bridge, and provided with a central opening in line with the tube, said block forming, in fact, the termination of the tube. The opening in the guide-block is in line with rod 55, so that as each stud drops down out of the block its head rests upon the top of sleeve 56, which acts as a cup to receive and hold it. The studs drop down by gravity as fast as required. As soon as one has been seized and carried forward by the jaws another drops down in its place. The faces of the jaws are provided with recesses 63, in which the studs rest as they are carried forward.

In Fig. 3 the slide is at its retracted position—that is, its farthest position inward—stump 46 being in engagement with the lowest portion of the periphery of cam 18, and spring projections 51 upon the clamping-arms resting in the inward curves, 53, in the faces of the cams, so that the jaws are open, thus permitting the stud to drop down between them, the head, or rather the outer head, thereof resting upon the top of sleeve 56. As the forward movement of the cam progresses its first action is to close the jaws upon the stud, the faces of the jaws passing between the two heads of the stud. This closing action of the jaws is accomplished when the clamping-arms are thrown outward as the curved faces of the cam pass forward, the spring projections of said arms then resting on the straight portion of the faces of said cam. The forward movement of the slide is caused by the engagement of stump 46 with the face of cam 18, which rotates from left to right, so that while the contact-point with the stump is passing from the position indicated in Fig. 3 to the point in the periphery of the cam indicated by $d$ the slide will be steadily moving forward until the position indicated by $d$ is reached, in which position it will remain until the position indicated by $e$ is in contact with the stump. The stump then passes down the incline, which permits the backward movement of the slide, it being drawn backward by springs 49. As already stated, the jaws close upon the studs while the slide is in its retracted position—that is, as shown in Fig. 3. The stud is held firmly by the jaws and is carried forward by them until the head of the stud rests upon anvil 64, which is screwed into the bed. The top of the anvil may or may not be provided with a recess, 65, in which the head of the stud rests while the action of riveting is performed. It will be apparent that while the stud is in this position the shank end will project upward above the jaws. It will of course be understood that the corset-clasp or other article into which the studs are to be set and riveted is already provided with holes to receive the shanks. While the stud is in the position just described—that is, clamped between the jaws, with its head resting upon the anvil—the operator places the clasp over the shank, and a blow of hammer 66 completes the operation of riveting.

In Fig. 5 I have illustrated the position of the parts at the instant the blow of the hammer is delivered. In this figure bridge 61 is removed in order to make the construction more apparent.

In Fig. 6 I have illustrated the position of the parts at the next step in the method—that is, after the jaws have been opened by the passage of spring projections 51 down the curved inclines 53 on the faces of the cam, but before the backward movement of the slide has commenced.

In order that there shall be no possible interference between the jaws and sleeve 56 when the forward movement of the slide takes place, I have so constructed the parts that as soon as the forward movement commences the curved projections 67 upon the clamping-arms will engage bevels 60 upon arm 59, thus acting to force the sleeve down out of the way of the jaws. Spring 58 acts to force the sleeve back into the position shown in Fig. 3 as soon as curved projections 67 have passed forward of bevels 60, sleeve 76 acting as a stop to limit its upward movement.

68 is a plate at the front of the slide, which carries sleeve 76, and, together with the slide, is provided with a recess, 69, to receive the anvil when the forward movement of the slide takes place.

70 denotes a notch in the front of block 62, which permits the stud to pass out freely when the forward movement of the jaws takes place; and 71 denotes springs secured to the bridge, which curve outward and downward and act to hold the stud from tipping forward after it has dropped down upon sleeve 56 and before the jaws have closed upon it, it being of course impossible for the stud to tilt in any other direction, as the tube itself, assisted by sleeve 56, holds it. The jaws remain in the position shown in Fig. 6—that is, open—during the backward movement of the slide, there being sufficient room between the rear ends of the jaws when in this position to permit them to clear the stud. Having reached the farthest position back—that is, the position shown in Fig. 3—another stud is grasped by the jaws, and then a forward movement of the slide commences, as before, these operations being continuously repeated. The hammer is actuated by an eccentric, 72, on the main shaft, the eccentric rod 73 and the hammer itself being made adjustable in the usual or any preferred manner. The shank of the hammer has slight vertical movement, and is surrounded by a stiff coiled spring, 74, so that the blow of the hammer is not positive.

In practice I ordinarily make the fly-wheel and pulley 5 loose on the main shaft, and provide a clutch (not shown) operated by a rod, 75, with which I control the movements of the hammer.

The method of setting studs and rivets of this class heretofore practiced has been exceedingly slow and expensive, as each stud had to be manipulated independently by hand. For example, in setting studs in corset-stays each stud had to be picked up singly, then placed in proper position between jaws; next the jaws were closed upon it; then it was headed by a plunger, after which the jaws were opened again. This method virtually consisted of five separate steps and required the use of both hands and both feet of the operator. My invention wholly does away with this tedious series of operations, and automatically feeds and sets the studs as rapidly as the clasps can be manipulated by the operator.

It will of course be understood that the details of construction may be widely varied without departing from the spirit of my invention.

I claim—

1. In a machine for setting studs, rivets, &c., a hopper in which the studs are placed loosely, a feed-wheel having radial pins in pairs, which pick up the studs, and a magazine which receives them, in combination with jaws actuated by a cam, and springs, substantially as described, by which the studs are grasped and carried forward, and a hammer and anvil by which they are set while held in the jaws.

2. The magazine, the jaws, and the anvil, in combination with a hopper in which the studs are placed loosely, a feed-wheel having radial pins for picking up the studs and delivering them to the magazine, and spring-fingers acting in connection with the pins which throw off the studs when not picked up in the proper manner.

3. The hopper and feed-wheel, in combination with a magazine, wheel 41, pivoted therein to guide the studs, and tube 39, which forms a continuation of the magazine.

4. The hopper and the feed-wheel having pins 23 projecting radially from its periphery in pairs, in combination with the magazine, wheel 41, pivoted therein, and having pairs of arms which receive the studs and guide them into the magazine, and a spring, 43, which holds said wheel against movement except as it carries forward a stud.

5. The hopper, the magazine, and the feed-wheel having pins 23, which pick up the studs in the hopper, in combination with pivoted fingers, substantially as described, which engage the periphery of the feed-wheel, and means, substantially as described, whereby said fingers are caused to throw off the studs when not properly picked up by the pins.

6. The hopper, the magazine, and the feed-wheel having pins 23 and a groove, 22, in its periphery, in combination with pointed fingers, substantially as described, which engage said groove, and means, substantially as described, operating in connection with said fingers, whereby the studs are thrown off from the periphery when not properly picked up by the pins.

7. The hopper, magazine, and feed-wheel having pins 23, in combination with pivoted arm 24, carrying pins 27 and 30, finger 28, carried by pin 27, and spring 29, which holds said finger in operative position.

8. The hopper, magazine, and feed-wheel having pins 23 and groove 22, in combination with pins 27 and 30 and a downwardly-projecting finger, 28, carried by pin 27, pins 27 and 30 being so arranged relatively to pins 23 upon the feed-wheel that finger 28 is lifted up by one pair of pins as its point approaches the next pair, whereby the point of the finger is caused to pass over the head of a stud in proper position or to lift a stud out if not in proper position.

9. The hopper, magazine, and feed-wheel having radial pins 23, in combination with a finger, 34, carried by a sleeve, 33, and a spring, 36, whereby said finger is kept in engagement with the periphery of the wheel, the point of said finger being so curved that it will pass over the head of a stud in proper position, and will pass under a stud not in proper position and throw it off.

10. The hopper, magazine, and feed-wheel having radial pins 23, in combination with sleeve 33, spring 36, and a finger, 35, carried by said sleeve, which extends down as far as the periphery of the feed-wheel, but slightly at one side of the groove, whereby pins lying crosswise are thrown off.

11. The hopper, magazine, and feed-wheel, in combination with spring-fingers 28, 34, and 35, which engage the studs picked up by the feed-wheel, said fingers being so constructed and arranged as to pass over the heads of studs properly picked up and to throw off all studs not properly picked up.

12. The hopper, magazine, and feed-wheel having groove 22 and pins 23, in combination with arm 24, carried by loose sleeve 25, and having pins 27 and 30, and a finger, 28, carried by pin 27, which engages said groove, but is raised out at the instant each pair of pins 23 engages pin 30.

13. The hopper, magazine, and feed-wheel having pins 23, in combination with pivoted arm 24, finger 28, spring 29, and pin 30, which is adapted to engage pins 23 to raise finger 28, as and for the purpose set forth.

14. The hopper, feed-wheel having pins 23 and groove 22, finger 28, which engages said groove, and means, substantially as described, for operating said finger, in combination with the magazine, which receives the pins, and tube 39, which conducts them away.

15. The hopper and feed-wheel having groove 22 and pins 23, in combination with finger 28, means, substantially as described, for operating said finger, the magazine, and guide-wheel 41, pivoted therein.

16. The hopper, feed-wheel, magazine, and tube, in combination with slide 45, means, substantially as described, whereby it is reciprocated, and jaws 48.

17. The tube and block 62, having notch 70, in combination with jaws having recesses 63, slide 45, by which the jaws are carried, cam 18, and springs 49, by which the slide is reciprocated and the jaws opened and closed.

18. The slide having stump 46, and the jaws and clamping-arms carried by said slide, in combination with cam 18 and springs 49, as and for the purpose set forth.

19. The slide, the clamping-arms pivoted thereto and carrying the jaws, and springs 49, connected to said clamping-arms and to the bed of the machine, in combination with a cam, 18, the periphery of which engages said slide to impart reciprocatory motion, and whose opposite faces are engaged by the clamping-arms to open and close the jaws.

20. The slide, clamping-arms pivoted thereto, the jaws made integral with the arms, and spring projections 51 upon said arms, in combination with springs 49 and cam 18, as described, and for the purpose set forth.

21. The tube and block 62, in combination with spring-actuated sleeve 56, beveled arm 59, projecting from said sleeve, and clamping-arms which carry the jaws, and are provided with curved projections 67, which engage the beveled arm and force the sleeve down as the jaws move forward, as and for the purpose set forth.

22. Supply-tube 39 and slide 45, carrying the jaws and clamping-arms, in combination with cam 18 and springs 49, whereby the slide and jaws are operated, and an anvil and hammer, substantially as described.

23. The supply-tube and slide having recess 69, and spring-arms carrying the jaws pivoted thereto, in combination with cam 18 and springs 49, which control the movements of the slide and jaws, guide-block 62, and the spring-actuated sleeve which supports the studs until they are grasped by the jaws.

24. The combination, with the slide and clamping-arms having curved projections 67, and the jaws, of a spring-actuated sleeve, 56, having a beveled arm, 59, adapted to engage projections 67, whereby said sleeve is forced down out of the way as each stud is carried forward by the jaws.

25. The slide having plate 68, with depending sleeve 76, rod 55, carrying spring-actuated sleeve 56, and beveled arm 59, projecting from said sleeve, in combination with cam 18, clamping-arms pivoted to the slide, and the jaws carried thereby.

26. Guide-block 62, having notch 70, and spring 71, whose ends rest in front of said notch, in combination with spring-actuated sleeve 56, the slide, and the jaws carried thereby.

27. The combination, with devices for automatically feeding the studs, of a pair of jaws carried by a slide, an anvil, and mechanism—for example, cam 18 and springs 49—whereby the slide is actuated and the jaws are caused to grasp each stud and carry it forward to the anvil.

28. The combination, in a stud feeding and setting machine, of a conveying-tube, 39, an anvil, jaws carried by a slide, and mechanism—for example, cam 18 and springs 49—whereby the slide is actuated and the jaws are caused to seize each stud and carry it forward to the anvil.

29. The combination, with devices, substantially as described, for automatically feeding the studs, of guide-block 62, which receives the studs and is provided with a notch, 70, spring-actuated sleeve 56, and springs 71, whereby the studs are held in position to be grasped.

30. The combination, with automatic feeding devices, jaws carried by a slide, and mechanism for actuating said jaws and slide, of a spring-actuated sleeve whose upper end serves as a cup to receive the studs, and which is provided with a beveled arm adapted to be engaged by projections 67 to force said sleeve down out of the way when the jaws move forward with the stud.

In testimony whereof I affix my signature in presence of two witnesses.

JULIUS WENGER.

Witnesses:
A. M. WOOSTER,
C. E. RUGGLES.